(No Model.)
J. P. GRUBER.
Pressure Regulator and Filter.
No. 240,018.          Patented April 12, 1881.
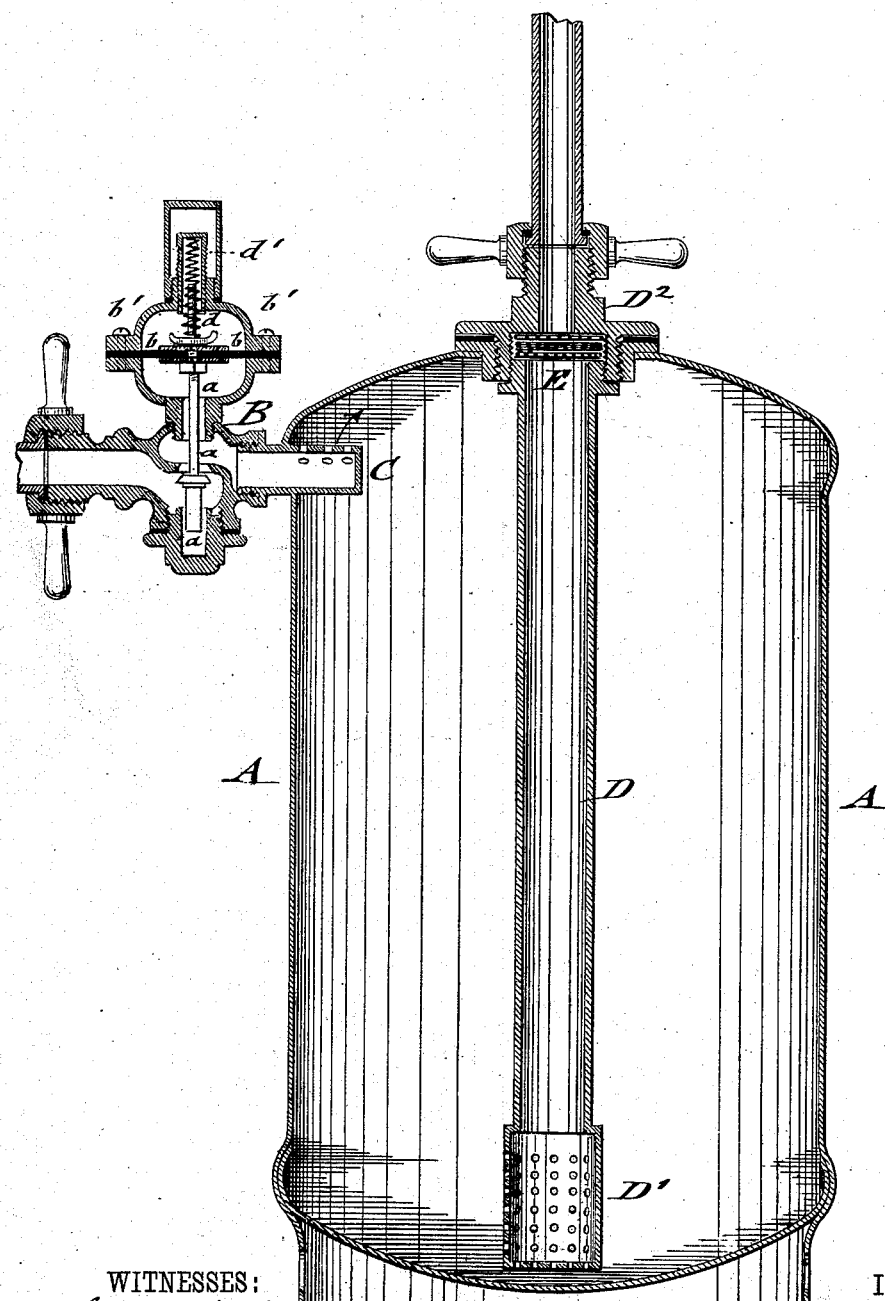
WITNESSES:
Carl Kain
Otto Risch
INVENTOR
John P. Gruber
BY Paul Goepel
ATTORNEY

UNITED STATES PATENT OFFICE.

JOHN P. GRUBER, OF JERSEY CITY HEIGHTS, NEW JERSEY.

PRESSURE-REGULATOR AND FILTER.

SPECIFICATION forming part of Letters Patent No. 240,018, dated April 12, 1881.

Application filed January 19, 1881. (No model.)

*To all whom it may concern:*

Be it known that I, JOHN P. GRUBER, of Jersey City Heights, in the county of Hudson and State of New Jersey, have invented certain new and useful Improvements in Pressure-Regulators and Filters for Ale, &c., of which the following is a specification.

The object of this invention is to furnish, for the purpose of drawing ale, root-beer, and other effervescent beverages, an improved pressure-regulator and filter, by which the excessive foaming of the liquid is reduced and the same furnished in a perfectly clear state, free of hops, yeast, or other impurities, so that retail dealers of ale and similar beverages are enabled to dispense the same in a more convenient and attractive manner to their customers.

The invention consists of a pressure-regulating vessel or chamber which is provided at the supply-pipe with an adjustable pressure-regulating valve, through which the liquid has to pass on its way to the vessel. The liquid is discharged, by the pressure in the vessel, through a central discharge-pipe, which is provided with a strainer at its lower end, and with a compound wire filter at its upper end.

The accompanying drawing represents a vertical central section of my improved pressure-regulator and filter for effervescent liquids.

A in the drawing represents a cylindrical vessel or receptacle of suitable size, which is made of strong sheet-copper lined with block-tin, and provided with a perforated supporting base-flange.

A pressure-regulating valve, B, is arranged preferably near the top part of the vessel A, and connected with the supply-pipe by a suitable coupling. The shank of the pressure-regulating valve B is firmly applied to the center of a disk-shaped rubber or other elastic diaphragm, $b$, and adjusted to the desired pressure by means of a spiral spring, $d$, which is applied to the upper part of the valve-stem above the diaphragm. The tension of the spring $d$ is regulated by a screw-cap, $d'$, which is set higher or lower in the casing $b'$ of the rubber diaphragm. The screw-cap $d'$ is protected, when once set for the proper pressure, by a tightly-fitting cap, $e$, which screws on the threaded neck of the casing $b'$, and prevents meddling with the valve B. The diaphragm $b$ is tightly secured between the sections of the supporting-casing $b'$ and the valve-stem guided below the valve-seat in a guide-socket of a screw-nut, $a'$, so as to retain the valve in a reliable manner toward its valve-seat, whatever be the degree of pressure to which the same has been adjusted. Whatever be the pressure in the cask or other receptacle, the same is reduced by the valve B to a lower pressure by the setting of the valve closer to or farther from its seat, so that the flow of the liquid is checked to a greater or less extent, and consequently any desired degree of pressure established in the vessel A. The different parts of the valve B are removable, so that the same may be readily and thoroughly cleaned whenever desired.

The liquid is passed from the pressure-regulating valve B through a short inlet-tube, C, and thence into the vessel A. The tube C is preferably arranged close to the top of the vessel A, closed at the inner end, but perforated at the top part, so that the liquid forced through the valve B and tube C is conducted along the top and side walls of the vessel, so as to gradually fill the same without forming any sediments at the top part, which, in case of ale or other fermented liquids, is objectionable, as they impart a disagreable taste to the liquid. This is prevented by the continual washing of the liquid along the inner surface of the top and side walls of the vessel.

The vessel A is further provided with a discharge-tube, D, which extends longitudinally through the vessel from the top down to near the bottom. Above the vessel the tube D is connected, by a connecting-piece, $D^2$, and coupling, to the pipe leading to the discharge-faucet. The discharge-tube D is provided at the lower end with a perforated strainer, $D'$, and at the upper end with a compound filter, E, formed of an outer coarse and intermediate finer strainer-disks, which are retained between the ends of the tube D and the exterior piece, $D^2$, which latter screws into the top of the vessel A. The strainer $D'$, at the lower part of the discharge-tube D, serves to keep out the coarser impurities, while the compound wire filter at the upper part retains the finer impurities—yeast-cells and the like. By unscrewing the connecting-piece $D^2$, removing the tube D, and detaching it from piece $D^2$, every part of the filter can be thoroughly cleaned.

For cooling the beverage passing through the vessel A it is surrounded by broken ice. As the liquid in the vessel A has a considerably lower pressure than in the cask it is discharged with less foaming into the glasses, it being at the same time, owing to the filtering device, furnished in a perfectly clear state, which is a point of great advantage in the dispensing of ale and other effervescent liquids.

Having thus described my invention, I claim as new and desire to secure by Letters Patent—

1. The combination, with an air-tight vessel, of a supply-pipe provided with a pressure-regulating valve, and of a discharge-pipe which is extended nearly to the bottom of the vessel, and provided with a strainer at the lower end and with a filtering device at its point of connection with the vessel, substantially as set forth.

2. The combination, with a vessel, A, of a pressure-regulating valve, B, and inlet-pipe C near the top of the vessel, said inlet-pipe being closed at the end and perforated at its upper part, substantially as set forth.

3. The combination, with a vessel, A, of a discharge-tube, D $D^2$, having a strainer, D', at the lower end, and a compound filter, E, at the upper end, substantially as specified.

In testimony that I claim the foregoing as my invention I have signed my name, in presence of two witnesses, this 13th day of January, 1881.

JOHN P. GRUBER.

Witnesses:
PAUL GOEPEL,
CARL KARP.